Patented June 2, 1942

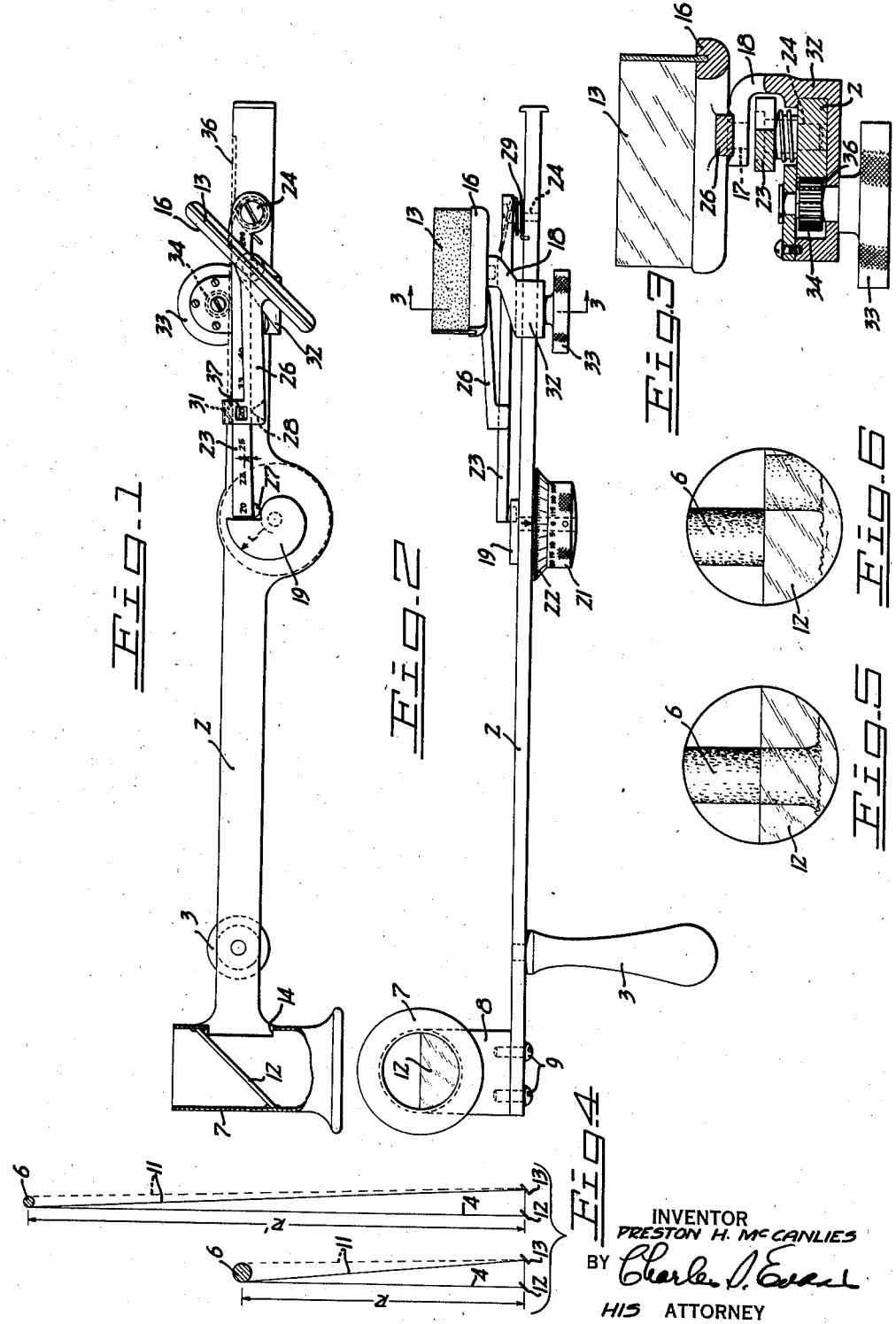

2,284,831

UNITED STATES PATENT OFFICE 2,284,831

MENSURATION INSTRUMENT

Preston H. McCanlies, Berkeley, Calif.

Application May 24, 1940, Serial No. 337,033

2 Claims. (Cl. 88—2.4)

My invention relates to an instrument for measuring objects; and more particularly to a device for measuring the width of trees while timber cruising.

It is among the objects of my invention to provide an instrument enabling an observer to determine the size of a distant object.

Another object is to provide an instrument of the character described which is calibrated to read directly in terms of the size of the object when the device is manipulated.

A further object is to provide means to adjust the instrument for different ranges from the observer to objects being measured.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a plan view, partially in section, of an instrument embodying the improvements of my invention; and Figure 2 is a side elevational view of the same.

Figure 3 is a transverse vertical sectional view, taken in a plane indicated by line 3—3 of Figure 2.

Figures 4, 5 and 6 are diagrammatic views illustrating the use of my instrument.

In terms of broad inclusion, my mensuration instrument comprises means for establishing a line of sight from an observer to a distant object to be measured; means for establishing another line of sight angularly disposed to the first line; means for changing the angle between said lines of sight; and means responsive to changes in said angle for indicating the size of the object. Means are also preferably provided to adjust the instrument for different ranges from the observer to objects being measured.

In greater detail, and referring to the drawing, my mensuration instrument preferably comprises an elongated base piece 2 normally held in horizontal position as shown in Figure 2. A depending handle 3 may be provided to assist in holding the instrument at eye level; the handle being preferably threaded in the base for detachment when the device is packed in a case. For still greater compactness the base piece may be made in sections hinged together so that it is collapsible.

Means are provided at one end of base 2 for establishing a line of sight 4 from the observer to an edge of a distant object 6 to be measured, as for example from the observer to the left edge of a tree as illustrated diagrammatically in Figure 4. This means may simply be a predetermined point suitably defined at the left end of base 2, over which the observer trains his eye when looking toward the object. However, I prefer to provide a sight tube 7 to assist in establishing the line of sight. The sight tube is preferably supported in a saddle 8 secured to the base by screws 9.

Means are also provided for establishing another line of sight angularly disposed to the first line 4. For this purpose I preferably provide a pair of reflectors or mirrors 12 and 13 adjacent the ends of base 2. Mirror 12 is fixed and is preferably semicircular and secured in the lower half of sight tube 7 at an angle of forty-five degrees to the first line of sight. The mirrors are arranged with their central vertical axes coinciding with the longitudinal axis of base 2, and an opening 14 in the side of tube 7 provides a window between the mirrors. Mirror 13 is also angularly disposed so that the light traveling along line 11 is reflected back to mirror 12. Thus the observer sees a portion of tree 6 above mirror 12 and another portion in the mirror. When the lines of sight 4 and 11 intersect at the left edge of the tree as indicated by the solid lines in Figure 4 the image portion registers with the actual tree as viewed in Figure 5.

Means are provided for turning mirror 13 to change the angle between lines of sight 4 and 11 to shift line 11 to the opposite edge of tree 6 as indicated by the dotted line in Figure 4. When so shifted the image in mirror 12 appears offset by the width of the tree as viewed in Figure 6; and means associated with the turning means are further provided to indicate the width of the tree when the condition of Figure 6 is achieved.

Mirror 13 is held by a grooved strip 16 pivoted by a pin 17 to a bracket 18, thus allowing this mirror to turn about its central vertical axis. Turning of the mirror is controlled by a cam 19 journaled at a widened intermediate portion of base 2 and actuated by a knob 21 having a scale 22. The linkage between the cam and mirror comprises a cam engaging arm 23 pivoted to base 2 by a pin 24, and a second arm 26 fixed to mirror mounting strip 16 and slidably engaging the first arm 23. A lug 27 on arm 23 provides a follower for riding on the cam, and a lug 28 on arm 26 provides a fulcrum point between the arms. Spring 29 about pivot pin 24 serves to hold follower lug 27 against the cam, and a spring 31 functions to hold lug 28 firmly against the side of arm 23.

Thus, by turning knob 21 arms 23 and 26 are caused to swing out and turn mirror 13 to decrease the angle between the lines of sight. Cam 19 is so designed and scale 22 is so calibrated that turning the cam three degrees represents an increase in width of one inch at the object. Each fifteen degree spacing on scale 22 thus represents five inches, or a total of one hundred and twenty inches about the circle. In the operation of the instrument the observer offsets the tree and image as in Figure 6, and then reads the diameter of the tree directly in inches on scale 22.

Figures 1 and 2 are half scale views of an instrument in which the spacing between the center of tube 7 and pivot 24 is fifteen inches, and in which arms 23 and 26 have effective lever arm lengths of five and two and one-half inches respectively. The rises $r$ in cam 19, from a base circle one-half inch in diameter, at fifteen degree intervals from zero are: .026, .052, .078, .104, .130, .156, .182, .208, .234, .260, .286, .312, .338, .365, .390, .417, .443, .469, .495, .521, .547, .573, .599 and .625 inch.

Means are also provided to adjust the instrument for different ranges from the observer to objects being measured. It is understood that objects at different ranges require that the lines of sight intersect at different points to achieve the registration of tree and image shown in Figure 5. Figure 4 illustrates the intersection for ranges R and R'. Thus, mirror 13 will have different initial angular positions for different ranges. A change in the initial angular setting of the mirror is effected by shaping the forward edge of arm 23 to operate as a cam for turning arm 26 and connected mirror 13 when the latter elements are moved axially of the instrument.

To achieve the axial movement bracket 18 is fastened to a carriage 32 slidable along base 2 and controlled by a knob 33 connected to a pinion 34 journaled on the carriage and meshed with a rack 36 on the base. Carriage 32 is adapted to slide past pivot 24 so that lug 28 may be shifted substantially the full length of arm 23, base 2 being extended somewhat beyond pivot 24 to take care of the carriage travel. Lugs 27 and 28 are also preferably offset to enable lug 28 to move out to the end of arm 23.

In the instrument shown, arm 23 is marked off at half inch intervals from pivot 24, indicating ranges of about two hundred, one hundred, sixty-six, fifty, forty, thirty-three, twenty-eight, twenty-five, twenty-two and twenty feet. The rises $x$ in the cam (from a base line registering with the axis of the instrument in the initial position of the arm) for the approximate range points above mentioned are respectively: .009, .017, .025, .032, .039, .045, .051, .056, .061 and .065 inch. An aperture 37 in arm 26 provides a window through which the range markings on arm 23 are visible to indicate the range setting.

In addition to controlling the initial angular position of mirror 13, the linkage comprising arms 23 and 26 also functions to vary the degree of change in the angle between the lines of sight to compensate for apparent differences in object size due to perspective at different ranges. Figure 4 shows an object 6 at range R and the same object at some longer range R'. At the longer range the object of course appears smaller to the observer due to perspective, as indicated. In order to be accurate however, dial 22 must turn the same amount in both cases to indicate the true size of the object.

This correction is made in my instrument by the fact that the lever arm from fulcrum 28 to pin 24 increases when adjusted for shorter ranges, and decreases when adjusted for longer ranges. This causes cam 19 to be turned the same amount at both ranges, although the actual turning of mirror 13 at the longer range is less than for the shorter range.

If the range adjustment is not desired the instrument may be considerably simplified by mounting mirror 13 directly upon an arm which engages cam 19. For example in Figure 1, if mirror 13 is moved so that its axis coincides with pin 24, which happens when the range is about forty feet, then arms 23 and 26 turn as a unit and could be replaced by a single arm. With a single range instrument however the observer would always have to position himself at the range for which the instrument was designed.

It is also understood that the single arm instrument may be employed as a range finder by using a properly shaped cam 19 and calibrating dial 22 in terms of range from the observer to the distant object. Otherwise the device is operated in the same manner as determining the size of the object.

I claim:

1. A mensuration instrument comprising a base, means on the base for establishing a line of sight from an observer to a distant object, means including a turnable reflector for establishing another line of sight angularly disposed to the first line, an arm pivoted to the base, a second arm mounted to turn with the reflector and slidably engaging the first arm, a cam journaled on the base and engaging the first arm for turning it to change the angle between said lines of sight, means operatively connected with the cam for indicating a measurement relating to said object, and means for mounting said reflector and second arm for slidable movement relative the first arm to control the degree of change in said angle.

2. A mensuration instrument comprising a base, means on the base for establishing a line of sight from an observer to a distant object, means including a turnable reflector for establishing another line of sight angularly disposed to the first line, an arm pivoted to the base, a second arm mounted to turn with the reflector and slidably engaging the first arm, a cam journaled on the base and engaging the first arm for turning it to change the angle between said lines of sight, means operatively connected with the cam for indicating a measurement relating to said object, means for mounting said reflector and second arm for slidable movement relative the first arm to control the degree of change in said angle, and a cam surface on one of said arms for controlling the initial position of the reflector.

PRESTON H. McCANLIES.